US012055883B2

(12) United States Patent
Yamaguchi

(10) Patent No.: US 12,055,883 B2
(45) Date of Patent: Aug. 6, 2024

(54) BELT DRIVE DEVICE WITH ENCODER DISK SECURED TO DRIVEN PULLEY AND IMAGE FORMING APPARATUS

(71) Applicant: KYOCERA Document Solutions Inc., Osaka (JP)

(72) Inventor: Akihiro Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/211,631

(22) Filed: Jun. 20, 2023

(65) Prior Publication Data

US 2023/0408962 A1 Dec. 21, 2023

(30) Foreign Application Priority Data

Jun. 21, 2022 (JP) ................................. 2022-099787

(51) Int. Cl.
*G03G 15/00* (2006.01)

(52) U.S. Cl.
CPC .................................. *G03G 15/757* (2013.01)

(58) Field of Classification Search
CPC ............... G03G 15/00; G03G 15/0189; G03G 15/6526; G03G 15/6529; G03G 15/757; G03G 2115/0141; G03G 2115/016
USPC ......................................... 399/159, 162, 167
See application file for complete search history.

(56) References Cited

U.S. PATENT DOCUMENTS

2013/0243482 A1* 9/2013 Kato .................... G03G 15/161 399/121

FOREIGN PATENT DOCUMENTS

JP 2010122551 A 6/2010
JP 2020-030276 * 2/2020

* cited by examiner

*Primary Examiner* — Hoan H Tran
(74) *Attorney, Agent, or Firm* — IP Business Solutions, LLC

(57) ABSTRACT

A belt drive device includes a drive source, a drive pulley, a driven shaft, a driven pulley, a belt, and a speed detecting device. The drive pulley is rotated about an axis thereof by the drive source. The driven shaft is rotatable about an axis thereof. The driven pulley is secured to and in axial alignment with the driven shaft. The belt is annularly formed of a metallic flat belt and mounted around the drive pulley and the driven pulley. The speed detecting device includes an encoder disk and a single optical sensor. The encoder disk has an optical pattern formed thereon. The optical sensor reads the optical pattern. The speed detecting device detects a rotational speed of the driven shaft based on a result of the optical sensor having read the optical pattern. The encoder disk is secured to and in axial alignment with the driven pulley.

4 Claims, 3 Drawing Sheets

BELT DRIVE DEVICE WITH ENCODER DISK SECURED TO DRIVEN PULLEY AND IMAGE FORMING APPARATUS

INCORPORATION BY REFERENCE

This application claims priority to Japanese Patent Application No. 2022-099787 filed on 21 Jun. 2022, the entire contents of which are incorporated by reference herein.

BACKGROUND

The present disclosure relates to belt drive devices and image forming apparatuses.

In a general multicolor image forming apparatus, adjacent two photosensitive drums are wrapped, together with a motor, by two respective metallic belts and a drive force of the motor is transmitted to the adjacent two photosensitive drums via the two metallic belts. In providing the above multicolor image forming apparatus with rotation sensors for the purpose of stabilizing the rotational speeds of the photosensitive drums, it is believed that it is sufficient to provide a rotation sensor for one of each adjacent two photosensitive drums.

SUMMARY

A technique improved over the aforementioned technique is proposed as one aspect of the present disclosure.

A belt drive device according to an aspect of the present disclosure includes a drive source, a drive pulley, a driven shaft, a driven pulley, a belt, and a speed detecting device. The drive pulley is rotated about an axis thereof by the drive source. The driven shaft is rotatable about an axis thereof. The driven pulley is secured to and in axial alignment with the driven shaft. The belt is annularly formed of a metallic flat belt and mounted around the drive pulley and the driven pulley. The speed detecting device includes an encoder disk and a single optical sensor. The encoder disk has an optical pattern formed thereon. The optical sensor is capable of reading the optical pattern. The speed detecting device detects a rotational speed of the driven shaft based on a result of the optical sensor having read the optical pattern. The encoder disk is secured to and in axial alignment with the driven pulley.

An image forming apparatus according to another aspect of the present disclosure includes the above-described belt drive device and an image forming device. The image forming device includes a photosensitive drum rotatable about the driven shaft and forms an image on a medium.

DETAILED DESCRIPTION

Hereinafter, a description will be given of an embodiment of the present disclosure with reference to the drawings. The symbols Fr, Rr, L, R, U, and D shown in figures represent front, rear, left, right, upper, and lower, respectively. It should be understood that, although terms representing directions and terms representing locations are used herein, these terms are merely for explanatory purposes and are not intended to limit the technical scope of the present disclosure.

[Image Forming Apparatus 1]

Figure 1:
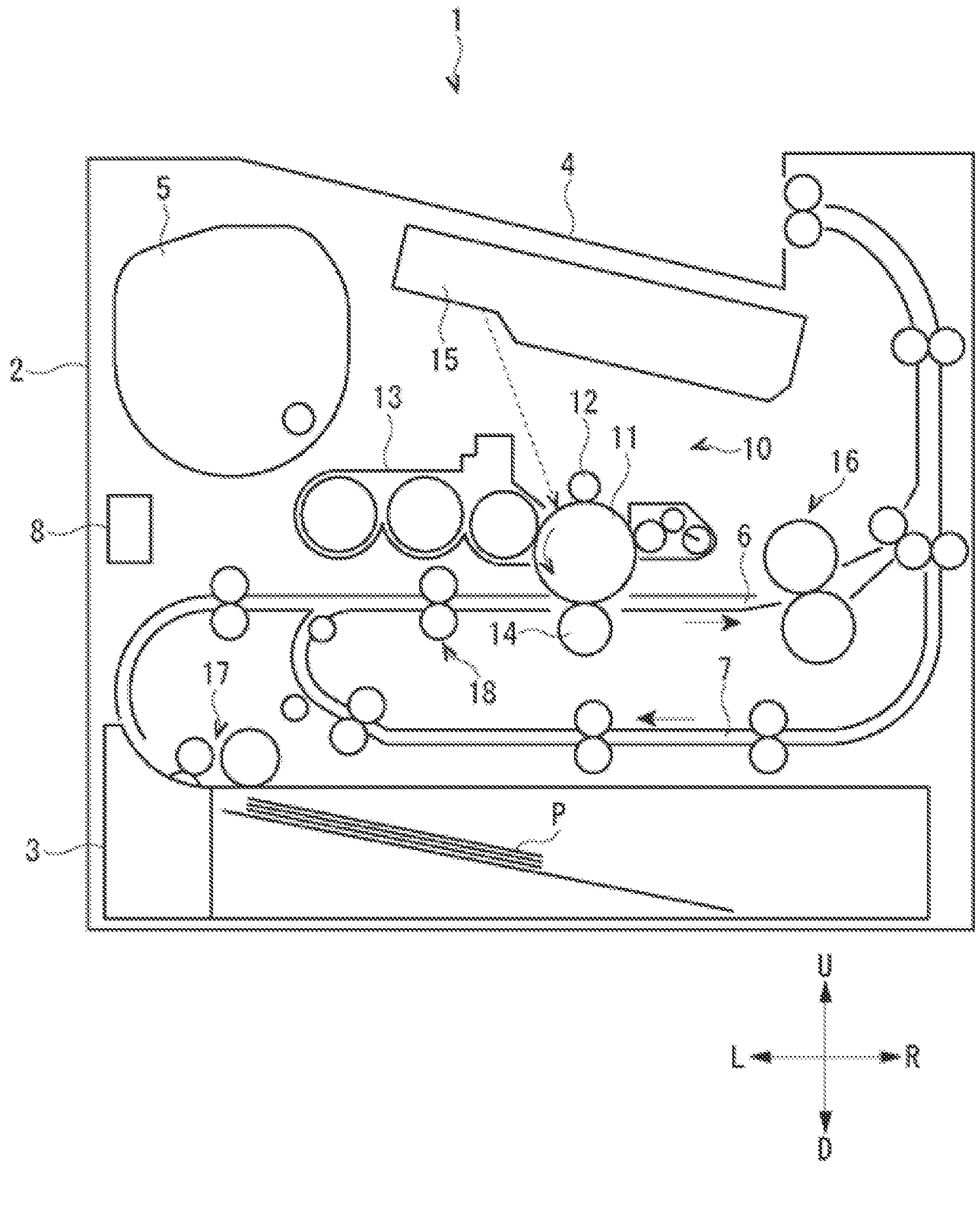
FIG. 1 is a frontal view schematically showing an internal structure of an image forming apparatus.

An image forming apparatus 1 will be described with reference to FIG. 1. FIG. 1 is a frontal view schematically showing an internal structure of the image forming apparatus 1.

The image forming apparatus 1 includes an apparatus body 2 forming an approximately cuboid appearance. The inside bottom of the apparatus body 2 is provided with a sheet feed cassette 3 for use to accommodate paper sheets P as media and the sheet feed cassette 3 is removable from the apparatus body 2. A sheet output tray 4 is provided on the top surface of the apparatus body 2. An upper left portion of the interior of the apparatus body 2 is provided with a toner container 5 containing, for example, a black toner as a developer.

The image forming apparatus 1 includes an image forming device 10 that forms an image on a sheet Pin an electrophotographic manner. The image forming device 10 includes a photosensitive drum 11, a charging device 12, a developing device 13, a transfer roller 14, an optical scanning device 15, and a fixing device 16.

The photosensitive drum 11 is formed in the shape of a cylinder extending in the front-to-rear direction. The photosensitive drum 11 is provided rotatably about an axis thereof. The photosensitive drum 11 is provided in a middle portion of a first conveyance path 6 extending from the sheet feed cassette 3 to the sheet output tray 4. The charging device 12, the developing device 13, and the transfer roller 14 are arranged in the order of an image formation process around the photosensitive drum 11. The transfer roller 14 is in contact with the photosensitive drum 11 from below to form a transfer nip between them. The optical scanning device 15 is provided above the photosensitive drum 11. The fixing device 16 is provided in a downstream side of the first conveyance path 6.

A sheet feed device 17 is provided at the upstream end of the first conveyance path 6. A registration roller pair 18 is provided in the middle portion of the first conveyance path 6 and upstream of the photosensitive drum 11. A second conveyance path 7 is provided in the interior of the apparatus body 2. The second conveyance path 7 is branched from the first conveyance path 6 in the downstream side of the first conveyance path 6 and joins an upstream side of the first conveyance path 6. Each of the first conveyance path 6 and the second conveyance path 7 is provided with a plurality of conveyance roller pairs for use to convey a sheet P.

The image forming apparatus 1 is provided with a control device 8 for controlling various components to be controlled. The control device 8 includes a processor or the like that executes various types of arithmetic processing in accordance with programs and parameters stored in a memory. The image forming apparatus 1 is provided with a display input device including a touch panel or buttons or the like through which the user inputs various instructions. The display input device is electrically connected to the control device 8. The display input device sends an input signal to the control device 8 and receives an electric signal (for example, display data for the touch panel) sent from the control device 8.

[Image Formation Processing]

Hereinafter, a description will be given of the operation of the image forming apparatus 1. The control device 8 executes image formation processing in the following manner, for example, based on image data input from an external terminal.

The charging device 12 electrically charges the surface of the photosensitive drum 11. The optical scanning device 15 emits scanning light based on image data to form an electrostatic latent image on the surface of the photosensitive drum 11. The developing device 13 uses a toner supplied from the toner container 5 to develop a toner image on the surface of the photosensitive drum 11. The sheet feed device 17 feeds sheets P one by one from the sheet feed cassette 3 to the first conveyance path 6. The conveyance roller pairs in the first conveyance path 6 convey the sheet P along the first conveyance path 6. The registration roller pair 18 corrects skew of the sheet P and allows the sheet P to enter the transfer nip. The transfer roller 14 transfers the toner image on the photosensitive drum 11 to the sheet P passing through the transfer nip. The fixing device 16 thermally fixes the toner image on the sheet P. In the case of single-sided printing, the conveyance roller pairs in the first conveyance path 6 discharge the sheet P onto the sheet output tray 4.

In the case of double-sided printing, the conveyance roller pairs in the first conveyance path 6 transfer, at the downstream end of the first conveyance path 6, the sheet P with an image formed on the front side to the second conveyance path 7 in a switchback manner. The conveyance roller pairs in the second conveyance path 7 convey the switched-back sheet P along the second conveyance path 7 and then return it to the first conveyance path 6. Through the same process as described above, an image is formed on the back side of the sheet P returned to the first conveyance path 6. The conveyance roller pairs in the first conveyance path 6 discharge the sheet P printed on both sides to the sheet output tray 4.

[Belt Drive Device 20]

Figure 2:
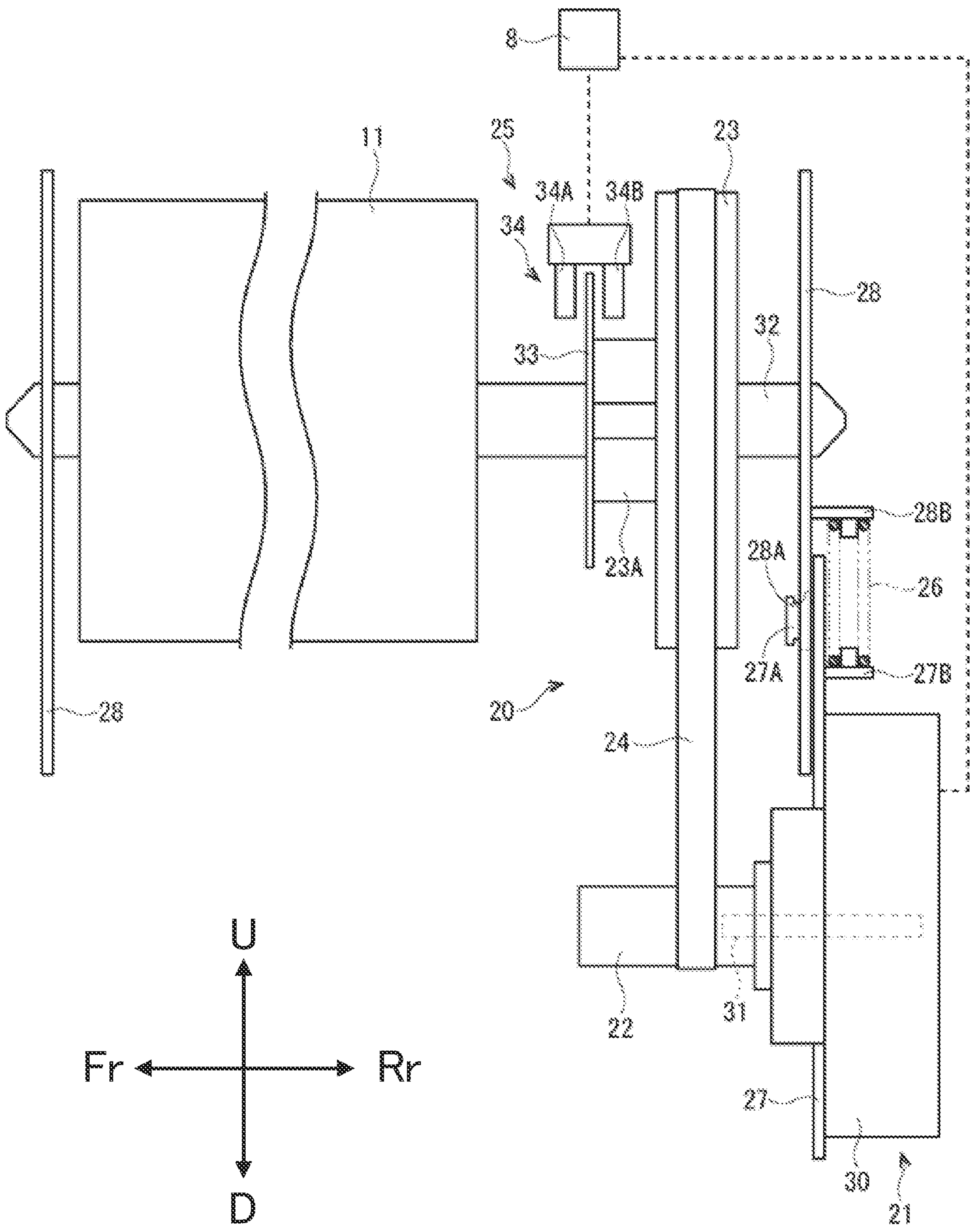
FIG. 2 is a side view schematically showing a belt drive device.

Next, a description will be given of the belt drive device 20 capable of rotating the photosensitive drum 11 about an axis thereof with reference to FIG. 2. FIG. 2 is a side view schematically showing the belt drive device 20.

The belt drive device 20 includes a drive source 21, a drive pulley 22, a driven pulley 23, a belt 24, a speed detecting device 25, and a tension applying device 26.

<Drive Source 21>

The drive source 21 is, for example, a DC motor. The drive source 21 includes a motor body 30 containing a stator, and a drive shaft 31. The drive shaft 31 extends from the axis of a rotor disposed inward of the stator and is supported rotatably about an axis thereof through a bearing. The motor body 30 is secured to one (a rear surface) of both surfaces of a first support member 27. The drive shaft 31 passes through an opening formed in a first support member 27 and extends out of the other (a front surface) of both the surfaces of the first support member 27. In this manner, the first support member 27 supports the drive shaft 31. The drive source 21 is electrically connected to the control device 8 and controlled by the control device 8.

The drive shaft 31 is made of, for example, a metallic material, such as iron or stainless steel, and formed with high accuracy free from bend (or with very little bend). The drive shaft 31 is supported, without tilt and without axial runout (or with very little axial runout) during rotation, by the motor body 30.

<Drive Pulley 22 and Driven Pulley 23>

Each of the drive pulley 22 and the driven pulley 23 is made of a metallic material or a wear-resistant synthetic resin and formed in a discoid shape (or a columnar shape). The drive pulley 22 is secured to and in axial alignment with the drive shaft 31 and is rotatable about an axis thereof by the drive source 21. The driven pulley 23 is formed with a larger diameter than the drive pulley 22 and disposed upwardly away from the drive pulley 22. The driven pulley 23 is secured to and in axial alignment with a driven shaft 32 rotatable about an axis thereof. The driven shaft 32 forms a central shaft portion of the photosensitive drum 11. The photosensitive drum 11 is rotatable about the driven shaft 32. The driven shaft 32 extends laterally from both the front and rear ends of the photosensitive drum 11 and is then supported through bearings by a pair of second support members 28. The driven shaft 32 and the photosensitive drum 11 are disposed approximately in parallel with the drive shaft 31 of the drive source 21. A central portion of the driven pulley 23 is formed with an engaging portion 23A extending toward the photosensitive drum 11. The engaging portion 23A is divided into halves to hold the driven shaft 32 with elastic forces from the halves.

The driven shaft 32 is made of, for example, a metallic material, such as iron or stainless steel, and formed with high accuracy free from bend (or with very little bend). The driven shaft 32 is supported, without tilt and without axial runout (or with very little axial runout) during rotation, by the second support members 28. The drive pulley 22 and the driven pulley 23 are formed with high roundness. A central hole of the drive pulley 22 through which the drive shaft 31 passes and a central hole of the driven pulley 23 through which the driven shaft 32 passes are accurately formed in the centers of their circles. The drive shaft 31 is press-fitted in the central hole of the drive pulley 22. The driven shaft 32 is press-fitted in the engaging portion 23A of the driven pulley 23. The drive pulley 22 is secured against axial and radial movement, i.e., free from backlash, to the drive shaft 31. The driven pulley 23 is secured against axial and radial movement, i.e., free from backlash, to the driven shaft 32.

The pair of second support members 28 are secured to the apparatus body 2. A lower portion of one (a rear one) of the pair of second support members 28 is opposed to and overlapped with the front surface of an upper portion of the first support member 27. A vertically extending slide groove 28A is formed in the one second support member 28. The first support member 27 is provided with a guide projection 27A slidably inserted into the slide groove 28A. Thus, the first support member 27 is supported through the guide projection 27A vertically movably (slidably) by the second support member 28. Alternatively, a slide groove may be formed in the first support member 27 and a guide projection may be formed on the second support member 28.

<Belt 24>

The belt 24 is annularly formed of a metallic flat belt. The belt 24 is mounted around the drive pulley 22 and the driven pulley 23. The belt 24 is preferably made of, for example, martensitic or austenitic stainless steel. The thickness of the belt 24 is preferably not less than 20 μm and not more than 40 μm. The belt 24 transmits rotation of the drive pulley 22 and the drive shaft 31 to the driven pulley 23 and the driven shaft 32.

<Speed Detecting Device 25>

The speed detecting device 25 includes an encoder disk 33, an optical sensor 34, and a control device 8. The control device 8 is a component of the image forming apparatus 1, but is also a component of the speed detecting device 25.

(Encoder Disk 33)

The encoder disk 33 is formed in a discoid shape. The encoder disk 33 has an optical pattern formed thereon. For example, the optical pattern is a plurality of slits formed at regular angular intervals. The encoder disk 33 is formed with high roundness. A central hole of the encoder disk 33 through which the driven shaft 32 passes is accurately formed in the center of the circle.

The encoder disk 33 is secured to and in axial alignment with the driven pulley 23. Specifically, the encoder disk 33 allows the driven shaft 32 to pass through the central hole thereof and is adhesively bonded to an end surface of the driven pulley 23 located toward the photosensitive drum 11. The encoder disk 33 is secured to and in axial alignment with (or without axial misalignment from) the driven pulley 23 and the driven shaft 32. Therefore, the driven shaft 32, the driven pulley 23, and the encoder disk 33 rotate, with their axes (centers) on the same line, about the same axis. Alternatively, the encoder disk 33 may be secured by a fastening means, such as screw clamping, to the end surface of the driven pulley 23. The encoder disk 33 may be secured to an end surface of the driven pulley 23 located on the side opposite to the photosensitive drum 11.

(Optical Sensor 34)

The optical sensor 34 is, for example, a transmissive photosensor including a light-emitting element 34A and a light-receiving element 34B opposed to each other. The optical sensor 34 is disposed with the encoder disk 33 interposed between the light-emitting element 34A and the light-receiving element 34B. The slits of the optical pattern pass light emitted from the light-emitting element 34A. The light-receiving element 34B receives light having passed through the slits. The portions of the optical pattern other than the slits block light emitted from the light-emitting element 34A (and, in other words, the light-receiving element 34B does not receive the light). The optical sensor 34 is electrically connected to the control device 8 and sends a light-receiving signal to the control device 8.

<Tension Applying Device 26>

The tension applying device 26 is a pair of compression coil springs mounted between the first support member 27 and the rear one of the pair of second support members 28. Specifically, a first abutment 27B is formed to extend approximately horizontally from the first support member 27. A second abutment 28B is formed to extend approximately horizontally from the one (rear) second support member 28. The tension applying device 26 is mounted between the first abutment 27B and the second abutment 28B. The tension applying device 26 urges the first support member 27 away (downward) from the second support member 28. The first support member 27 is slidably supported by the second support member 28. As a result, the drive source 21 (i.e., the drive shaft 31 and the drive pulley 22) is urged away from the driven shaft 32 and the driven pulley 23, resulting in the application of tension to the belt 24.

[Operation of Belt Drive Device]

Next, a description will be given of the operation (behavior) of the belt drive device 20.

When the image formation processing is started, the control device 8 drives the drive source 21. The drive source 21 rotates the drive shaft 31 and the drive pulley 22 about their axes. The rotational force of the drive pulley 22 is transmitted via the belt 24 to the driven pulley 23. The driven pulley 23 rotates the driven shaft 32 secured to the driven pulley 23 and the photosensitive drum 11 about their axes. In this manner, the belt drive device 20 transmits a drive force of the drive source 21 to the photosensitive drum 11.

The encoder disk 33 rotates about its axis together with the driven pulley 23. The speed detecting device 25 detects the rotational speed of the driven shaft 32 based on the result of the single optical sensor 34 having read the optical pattern formed on the encoder disk 33. Specifically, when the encoder disk 33 rotates, light emitted from the light-emitting element 34A of the optical sensor 34 passes through the slits of the optical pattern or is blocked by the other portions of the optical pattern. The light-receiving element 34B of the optical sensor 34 converts the light having passed through the slits to electric current (a light-receiving signal). The optical sensor 34 sends the light-receiving signal to the control device 8. The control device 8 converts the received light-receiving signal to a digital signal (a rectangular-wave output) and calculates the rotational speed of the photosensitive drum 11 and the driven shaft 32 based on the digital signal.

The memory of the control device 8 previously stores a normal range of rotational speeds of the photosensitive drum 11. The control device 8 performs feedback control on the drive source 21 based on the result of comparison between the calculated rotational speed and the normal range of rotational speeds. Specifically, when the calculated rotational speed is higher than the normal range, the control device 8 performs control for lowering the rotational speed of the drive source 21. When the calculated rotational speed is lower than the normal range, the control device 8 performs control for increasing the rotational speed of the drive source 21.

Since the driven shaft 32 and the driven pulley 23 are connected via the belt 24 to the drive shaft 31 and the drive pulley 22, the transmission of vibrations of the drive source 21 during drive to the driven pulley 23 is reduced compared to the case where the drive shaft 31 is connected via gearing to the driven shaft 32. As for the belt drive device 20 according to this embodiment, it has been confirmed that vibrations in a frequency range of 60 Hz to 500 Hz has been reduced.

In the structure of this embodiment, the encoder disk 33 smoothly rotates without vibrating and, therefore, the rotational speed of the driven shaft 32 (i.e., the rotational speed of the photosensitive drum 11) can be detected accurately. This enables the rotation of the photosensitive drum 11 at a regular speed, which ensures appropriate image formation processing. Furthermore, if vibrations in a frequency range of 60 Hz to 500 Hz occur, the control device 8 may erroneously detect that, despite a rotational speed falling within the normal range, the rotational speed is out of the normal range. However, since in the belt drive device 20 according to this embodiment vibrations in the above frequency range are reduced, erroneous detection of the rotational speed by the control device 8 can be reduced.

In the general image forming apparatus described above, a rotary encoder designed to read the optical pattern of an encoder disk (rotary disk) with an optical sensor is often employed as the rotary sensor for detecting the rotational speed of the photosensitive drum. Generally, it is difficult to mount the encoder disk directly to the photosensitive drum. Therefore, an attachment member is mounted as a separate member to the photosensitive drum and the encoder disk is mounted to the attachment member.

However, when a dimensional tolerance of the attachment member, a mounting error of the attachment member relative to the photosensitive drum, and a mounting error of the encoder disk relative to the attachment member are accumulated, the photosensitive drum may be misaligned in axis with (deviated in axis from) the encoder disk. If the optical sensor reads the optical pattern of the rotating encoder disk as an axis deviation has occurred, an irregular signal is output from the optical sensor, resulting in a failure to accurately detect the rotational speed of the photosensitive drum. Because the encoder disk is formed with a high degree of accuracy, no slight axis deviation is allowed.

For the purpose of allowing axis deviation of the encoder disk, there is a structure in which two optical sensors are opposed to each other across the rotational shaft of the encoder disk and the rotational speed of the photosensitive drum is calculated from an average value of output signals of the two optical sensors. However, this structure has a problem of an increased production cost due to the provision of the two optical sensors and, additionally, a problem of necessity for extra arithmetic processing, such as calculation of an average value of two output signals.

Unlike the above, in the belt drive device 20 according to the above embodiment of the present disclosure, the encoder disk 33 is secured to and in axial alignment with the driven pulley 23. This structure eliminates the need for any attachment member (separate member) for securing the encoder disk 33 to the driven shaft 32, in which case it is sufficient to accurately secure the encoder disk 33 to the driven pulley 23. Thus, there is no need to consider the dimensional tolerance and the mounting error of the attachment member and axis deviation of the encoder disk 33 can be reduced. As a result, the rotational speed of the driven shaft 32 can be detected accurately.

Since axis deviation of the encoder disk 33 can be reduced, a single optical sensor 34 is sufficient to read the optical pattern of the encoder disk 33. Thus, as compared to the case where two optical sensors are provided to allow axis deviation of the encoder disk 33, the production cost can be reduced and the rotational speed of the driven shaft 32 can be accurately calculated from an output signal of a single optical sensor 34.

In the belt drive device 20 according to the above embodiment, an approximately constant tension can be applied to the belt 24 by the tension applying device 26. Thus, a drive force of the drive pulley 22 and the drive source 21 can be properly transmitted via the belt 24 to the driven pulley 23 and the driven shaft 32.

Although in the belt drive device 20 according to the above embodiment the drive pulley 22 is secured to the drive shaft 31, the drive shaft 31 may be used as the drive pulley 22. In other words, the belt 24 may be mounted around the drive shaft 31 and the driven pulley 23.

Although in the belt drive device 20 according to the above embodiment the control device 8 of the speed detecting device 25 performs overall control of the image forming apparatus 1, the present disclosure is not limited to this structure. In place of the control device 8, a dedicated control device for controlling the belt drive device 20 (i.e., the drive source 21 and the speed detecting device 25) may be provided. Alternatively, the control device may be considered as part of the optical sensor 34.

Although in the belt drive device 20 according to the above embodiment the optical sensor 34 of the speed detecting device 25 is a transmissive photosensor, the optical sensor 34 is not limited to this type of sensor and may be a reflective photosensor.

Figure 3:
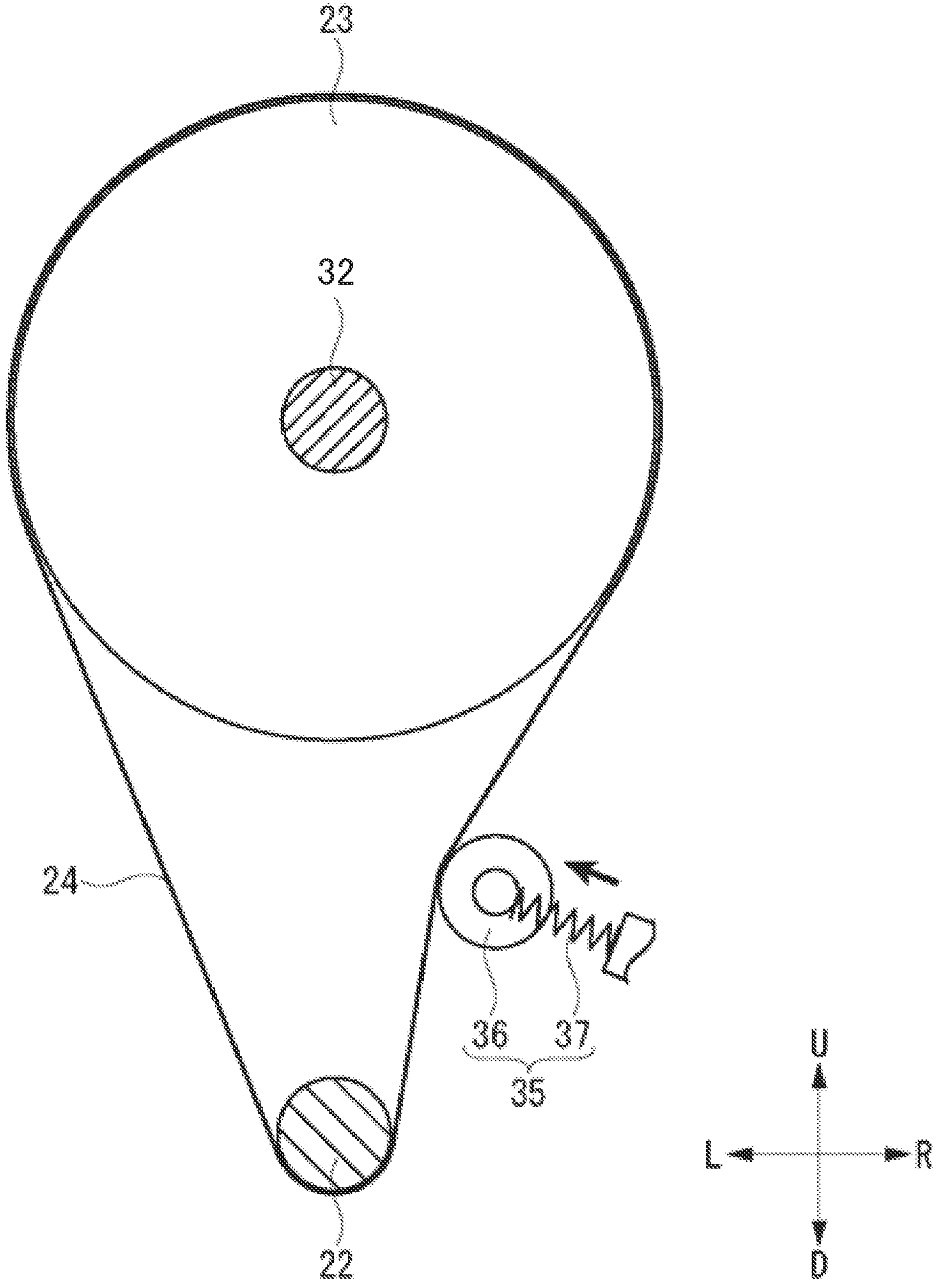
FIG. 3 is a frontal view schematically showing part of a belt drive device.

Although in the belt drive device 20 according to the above embodiment the tension applying device 26 is formed of a pair of compression coil springs, the present disclosure is not limited to this. As shown in FIG. 3, a tension applying device 35 in another embodiment may include a tension roller 36 and a coil spring 37. The tension roller 36 makes contact with the outer periphery of the belt 24 mounted around the drive pulley 22 and the driven pulley 23 which are paired. The coil spring 37 presses the tension roller 36 against the belt 24. In this case, the first support member 27 is preferably secured to the apparatus body 2.

Although the belt drive device 20 according to the above embodiment has a structure in which the driven shaft 32 of the photosensitive drum 11 is driven into rotation, the present disclosure is not limited to this structure. The object to be driven into rotation is not limited to the photosensitive drum 11 and may be, for example, a roller rotating about an axis.

Although the image forming apparatus 1 according to the above embodiment is a black-and-white printer, the present disclosure is not limited to this. The image forming apparatus 1 may be a multicolor printer, a copier, a facsimile machine or others. Although the image forming manner of the image forming apparatus 1 is an electrophotographic manner, the present disclosure is not limited to this manner. The image forming manner of the image forming apparatus 1 may be an inkjet printing manner.

The description of the above embodiment states an aspect of the belt drive device and the image forming apparatus according to the present disclosure. The technical scope of the present disclosure is not limited to the above embodiment. The present disclosure can be changed, substituted, and modified in various ways without departing from the spirit of the technical idea of the present disclosure and the claims appended hereto are intended to cover all embodiments which may fall within the scope of the technical idea of the present disclosure.

While the present disclosure has been described in detail with reference to the embodiments thereof, it would be apparent to those skilled in the art the various changes and modifications may be made therein within the scope defined by the appended claims.

What is claimed is:

1. A belt drive device comprising:

a drive source;

a drive pulley rotated about an axis thereof by the drive source;

a driven shaft rotatable about an axis thereof;

a driven pulley secured to and in axial alignment with the driven shaft;

a belt annularly formed of a metallic flat belt and mounted around the drive pulley and the driven pulley; and a speed detecting device that comprises an encoder disk with an optical pattern formed thereon and a single optical sensor capable of reading the optical pattern and detects a rotational speed of the driven shaft based on a result of the optical sensor having read the optical pattern, wherein the encoder disk is secured to and in axial alignment with the driven pulley.

2. The belt drive device according to claim 1, further comprising a tension applying device that applies a tension to the belt.

3. The belt drive device according to claim 2, further comprising:

a first support member that supports a shaft of the drive pulley; and a second support member that supports the driven shaft, wherein the tension applying device comprises a coil spring that urges the first support member away from the second support member.

4. An image forming apparatus comprising:

the belt drive device according to claim 1; and an image forming device that comprises a photosensitive drum rotatable about the driven shaft and forms an image on a medium.

* * * * *